Jan. 3, 1928.
P. BURKE
1,654,632
ENDLESS TREAD PROPELLING MECHANISM
Filed March 11, 1926    2 Sheets-Sheet 2
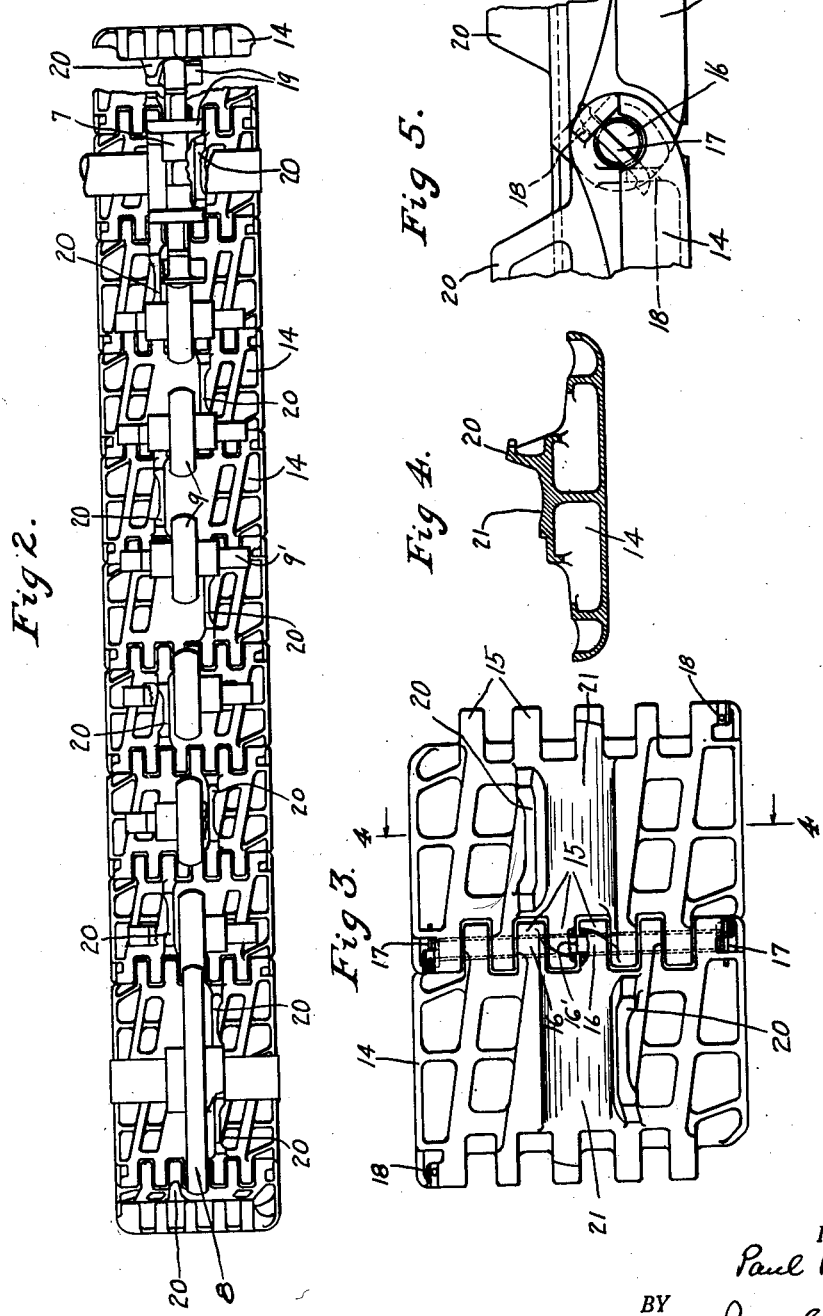
INVENTOR.
Paul Burke
BY Quarles & French
ATTORNEYS.

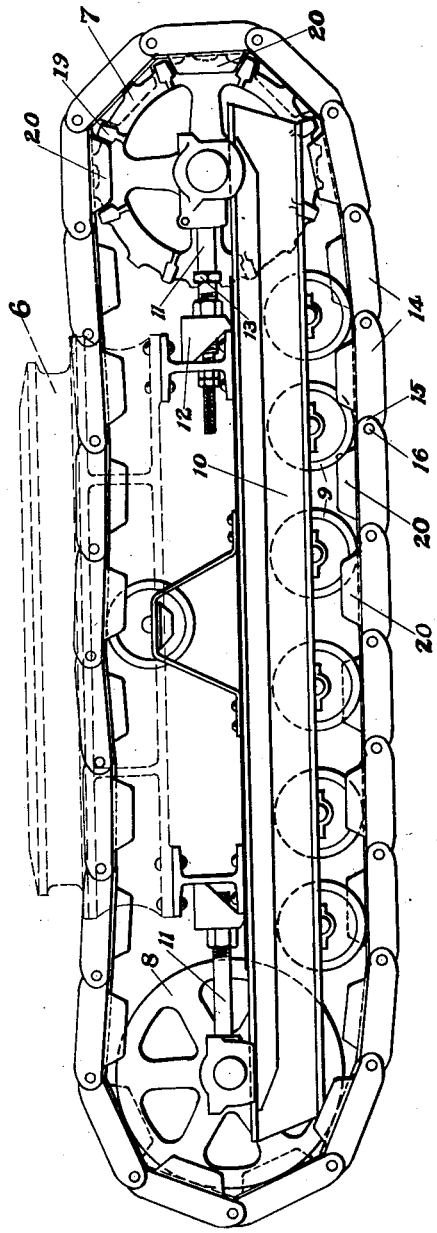

Patented Jan. 3, 1928.

1,654,632

UNITED STATES PATENT OFFICE.

PAUL BURKE, OF GREEN BAY, WISCONSIN, ASSIGNOR TO NORTHWEST ENGINEERING COMPANY, OF GREEN BAY, WISCONSIN, A CORPORATION OF WISCONSIN.

ENDLESS-TREAD PROPELLING MECHANISM.

Application filed March 11, 1926. Serial No. 94,032.

This invention relates to endless tread propelled type of vehicles, and more particularly to the tread mechanism for such vehicles.

With tread mechanism of this type, it has been common practice to provide some means for guiding the tread relative to the driving or load supporting rollers or wheels, and in some instances, to make this guiding means cooperate with the drive wheel to drive the tread. One of the methods of driving has been to provide a centrally disposed upstanding flange on each of the treads engageable with the drive sprocket, and to guide the intermediate portion of the tread by having this flange cooperate with a two-part roller, the roller thus straddling a single guide flange, this construction permitting the relatively easy exit of road materials that may find their way into the traction belt, but at the expense of lightness of the roller. It has also been proposed to use a pair of spaced apart upstanding guide flanges on each tread link with the load supporting rollers or wheels running in a track between said flanges, but this construction does not permit the easy egress of mud, stones or other portions of the road surface which may be picked up by the tread belt mechanism. One of the objects of my invention is to secure the advantage of a single, as distinguished from a two-part roller, without the disadvantage of a channel guide for said roller, with the result that one side of the tread, as it moves past the load supporting rollers or wheels, is always open, and will thus permit the ready egress from the treads of mud, stones, or other foreign matter that may work onto it.

A further object of the invention is to provide a tread construction in which the shoes or links may be readily reversed, end for end, with improved pivot connections between the links.

In tread mechanism of the character described, there is, due to inequalities in the surface over which the tread belts pass, a tendency to produce a tilting action on the ground run of the tread, though where the links are provided with a guide flange, only a limited amount of tilting in any one track link is possible due to the restraint imposed by the flange of the tread links engaging with the side or sides of the rim of the end sprockets or wheels, such restraint being transmitted through pivot pins to such shoes as are, for the moment, bearing the weight of the machine. Hence, there is only a limited amount of tilting of the whole section of the tread between the end wheels or sprockets. Usually the tread path for the rollers or load sustaining wheels, whether single or two-part, is provided with a flat face, and obviously then, in the event of a limited tilting of the tread, there can only be a point contact between the roller and the tread track which puts a severe localized strain in the link. Another object of my invention is to make the peripheries of the single rollers or intermediate load sustaining wheels of a slightly curved contour, and give the roller or wheel path a corresponding contour so as to preserve a full line contact between the rollers and the track, in the event of such limited tilting of said track relative to said rollers.

The invention further consists in the several features hereinafter set forth and more specifically defined by claims in the conclusion hereof.

In the drawings, Figure 1 is a side elevation view of a tread mechanism embodying the invention; Fig. 2 is a detail inner plan view of the lower run of the tread mechanism with the rollers and end wheels shown in assembled position; Figure 3 is a detail inner plan view of parts of the track; Figure 4 is a detail sectional view of one of the track links, taken on the line 4—4 of Figure 3; Figure 5 is a detail side elevation view of the hinge connection between the links.

In the drawings, I have shown the propelling tread associated with a base frame 6 of a rotating base type of machine such as a crane, shovel or dragline excavator. Such machines are well known in the art, and generally include a drive shaft disposed in the axis of rotation of the rotating base on the machine connected by suitable gearing, or chains, and sprockets with the driving wheel 7 of the tread mechanism, but since the invention resides in said tread mechanism, further detailed showing of the other parts of the machine is deemed unnecessary.

The driving sprocket 7 usually, though not necessarily, forms one of the end wheels, the other end wheel 3 being a roller or idler, and other intermediate wheels 9 being rollers. As shown, the shafts for the sprocket 7 and wheels 8 and 9 are journalled in suitable bearings associated with a frame member 10, and provision is made for taking up the slack in the endless belt or tread by turnbuckles, including a rod 11, thrust block 12, and nut 13 associated with shaft bearing for each end wheel.

The endless propelling belt or tread includes a plurality of links 14, preferably castings, provided with ears 15 to receive first pins 16. Referring to Figure 3, it will be noted that the ears of adjacent links interfit, and that the arrangement of the ears is such that either end of one link may be connected up with either end of the next link so that the links are reversible. It will also be noted that instead of using a single pin as a pivot between adjacent links, that two separate pins are used which are driven in from opposite sides of the adjoining links into abutting engagement in the central portion of the hinge connection, and that said pins are plain and are held merely against longitudinal displacement by short pins 17, which extend through openings 18 in one of the tread links but do not pass through the pins 16 themselves, as with this construction the length of pin bearing being substantially equal for each link, the pin may be free to turn. The use of two separate abutting pins has distinct advantage in that it permits ready assembly or disassembly of the tread links even though the link castings may be so warped as to prevent the use of a single pin being driven through the holes in the ears.

The driving wheel or sprocket 7 has laterally extending lugs or teeth 19 on each side, which are adapted to drivingly engage with upstanding guide lugs or flanges 20 on tread links 14 as in the prior U. S. patent to De'sy, No. 949,354, dated Feb. 15, 1910, but unlike said patent, it will be noted that there is only a single flange 20 on each link.

Referring now to Figure 2, it will be noted that the links are so arranged as to produce a staggered relation between the flanges on such of the links as, at the time, form the ground or lower run of the belt, though such staggering does not necessarily mean that these flanges are alternately staggered, but that they are preferably so staggered that not more than the flanges of three adjoining links are aligned with each other. Each of the links has a wheel surface portion 21, these being aligned so that a single, centrally disposed wheel track for the load sustaining wheels is formed with the flange adjacent one side of this portion 21. The result is that the wheels 7, 8 and 9 being aligned, and the flanges 20 of the links being some on one side of the track and some on the other and thus engageable with the ends of the rollers, said flanges will act as guides for the lower or ground run of the track, but since the side of the wheel track opposite the flange of any one link is always open, any mud, stones or other obstructions will be forced out through said open side, and, thus, clogging of the track and its driving connections with the drive wheel is avoided. Attention is also called to the fact that while the flanges are staggered, each flange has driving connection with the teeth on that side of the sprocket adjacent which said flange moves so that while the drive to the treads may shift from one side of the sprocket to the other, the treads are, however, positively driven by the driving wheel.

Reference has been previously made to the possible limited tilting of the tread due to ground obstructions, and to provide for a line contact between the tread on the rollers or wheels 9, I preferably make the wheel surface 21 of slightly curved formation, and the wheels 8 and 9 of similar curvature.

It is to be understood that the wheels 9 are load sustaining wheels and under some conditions the wheels 7 and 8 are load sustaining wheels, that the term "staggered" is not to be limited to alternately staggering adjacent links, and that the term "single flange" includes either a continuous flange or a flange having one or more aligned portions even though such portions be separated, though all portions to lie on one side only of the wheel track portion of each link.

From the foregoing description, it will be noted that I have provided a propelling mechanism of simple construction in which the load sustaining wheels are aligned along a central path on the links of the belt, and in which the track is driven and guided by flanges so arranged as to prevent clogging of the track.

What I claim as my invention is:

1. In an endless tread propelling mechanism, the combination of a tread belt comprising a series of connected tread links, each link having a tread surface on one side and an inwardly extending guiding flange on the other side, a plurality of aligned rollers engageable with the central portion of the inner surfaces of said links, the flange of each link being laterally offset from said central portion and engageable with one side only of said rollers, the flanges on all the links not being in line, the flanges of some of the links engaging one side of said rollers, and the flanges of other links engaging the other side of said rollers, and a driving wheel having tooth portions on opposite sides engageable with said flanges.

2. A tread link for endless tread propelling mechanism comprising a member having a broad tread surface and a centrally disposed load receiving surface, and an offset guide and drive means on one side only of said central load receiving surface.

3. In an endless tread propelling mechanism, the combination with a plurality of aligned load sustaining wheels and a driving wheel, of an endless belt passing over said wheels and comprising a plurality of pivotally connected links, each link having an outer tread engaging surface and an inner surface engageable with said wheels, and guide means on each link having driving engagement with said driving wheel, the guide means of the links during any length of the run between the end wheels being staggered and that for any one link engageable with only one side of said wheels.

4. In an endless tread propelling mechanism, the combination with an aligned set of load sustaining wheels, and a driving wheel, of an endless belt running over said wheels, comprising a series of links, each link having a wheel engaging surface and a single flange on its inner side at one side of said surface and forming a drive connection with said driving wheel and a guide for said wheels, said flanges being staggered relative to each other so that not more than three flanges of adjacent links are aligned with each other.

PAUL BURKE.